Inventors
WILLIAM B. GIST
ROBERT E. WEILER

Dec. 13, 1955 W. B. GIST ET AL 2,726,509
ADJUSTING SYSTEM FOR VARIABLE AREA NOZZLE
Filed April 2, 1953 2 Sheets-Sheet 2
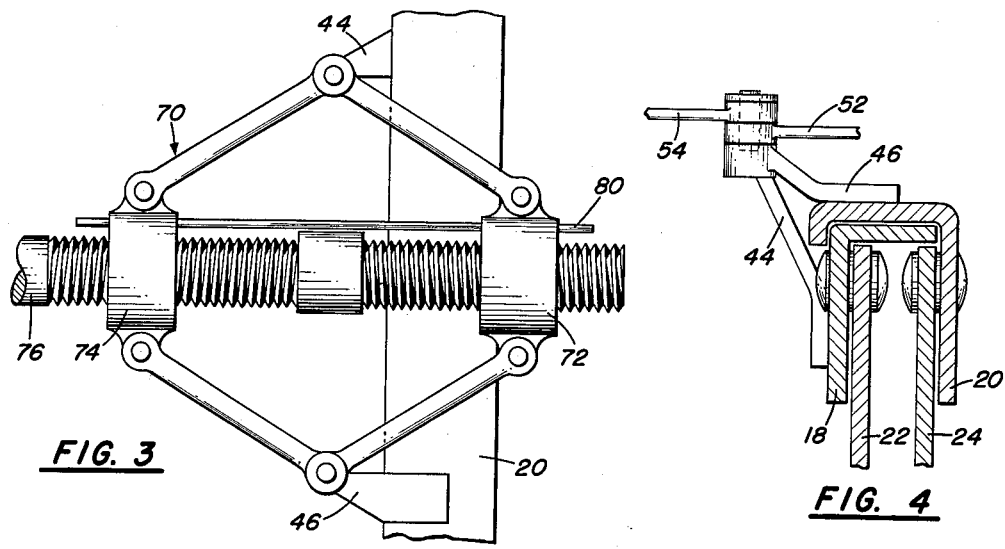
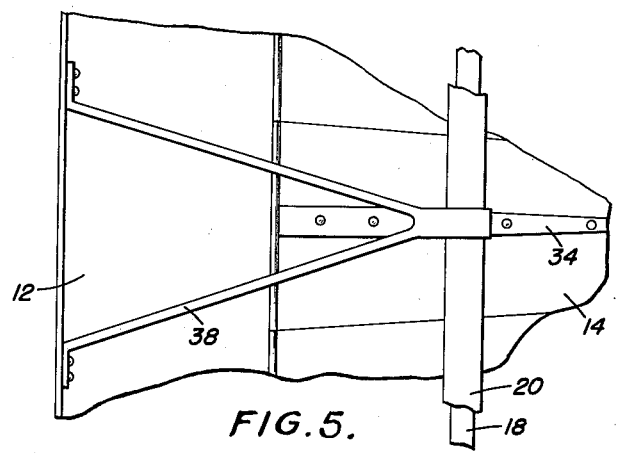
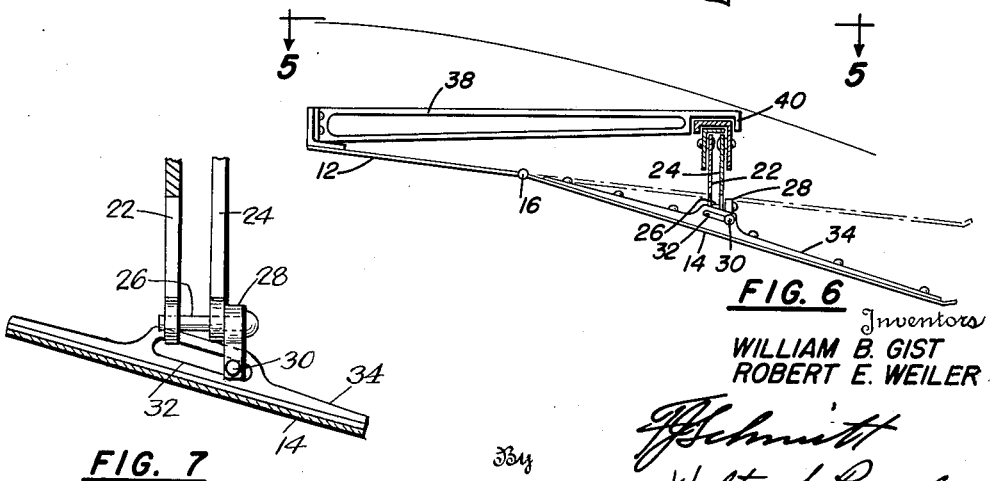
Inventors
WILLIAM B. GIST
ROBERT E. WEILER

United States Patent Office 2,726,509
Patented Dec. 13, 1955

2,726,509

ADJUSTING SYSTEM FOR VARIABLE AREA NOZZLE

William B. Gist, Van Nuys, Calif., and Robert E. Weiler, Drexel Hill, Pa., assignors, by mesne assignments, to the United States of America as represented by the Secretary of the Navy Application April 2, 1953, Serial No. 346,298

7 Claims. (Cl. 60—35.6)

This invention relates to nozzles of the variable area type, and particularly to means for adjusting the leaves of an iris type jet nozzle.

An object of the invention is to provide means for actuating the leaves of a variable area nozzle, diffuser or the like, that is light and requires a small installation envelope and small force for actuation. In aircraft use, such considerations are of major significance since they contribute to a greater payload, higher speed attainable and increased range of operation.

A more specific object of the invention is to provide concentric rings about the nozzle leaves with positive link connections between the rings and leaves arranged such that upon relative rotation of the rings, the leaves are hingedly actuated toward or away from the longitudinal axis of the nozzle thereby varying the cross sectional area of the nozzle.

Other objects and features will become apparent in following the description of the illustrated forms of the invention.

In the drawings:

Fig. 3 is a modification of the device of Fig. 2;

Fig. 4 is an enlarged transverse sectional view of the nozzle of Fig. 1 with the actuating assembly in place.

Fig. 5 is a fragmentary top view of the nozzle showing particularly a support that serves as a guide for the rings of the leaf actuating means, and is taken on the line 5—5 of Fig. 6;

Fig. 6 is an enlarged sectional view taken on the line 6—6 of Fig. 1 and in the direction of the arrows;

Fig. 7 is an enlarged transverse sectional view of a part of Fig. 6, with parts broken away.

Figure 1:
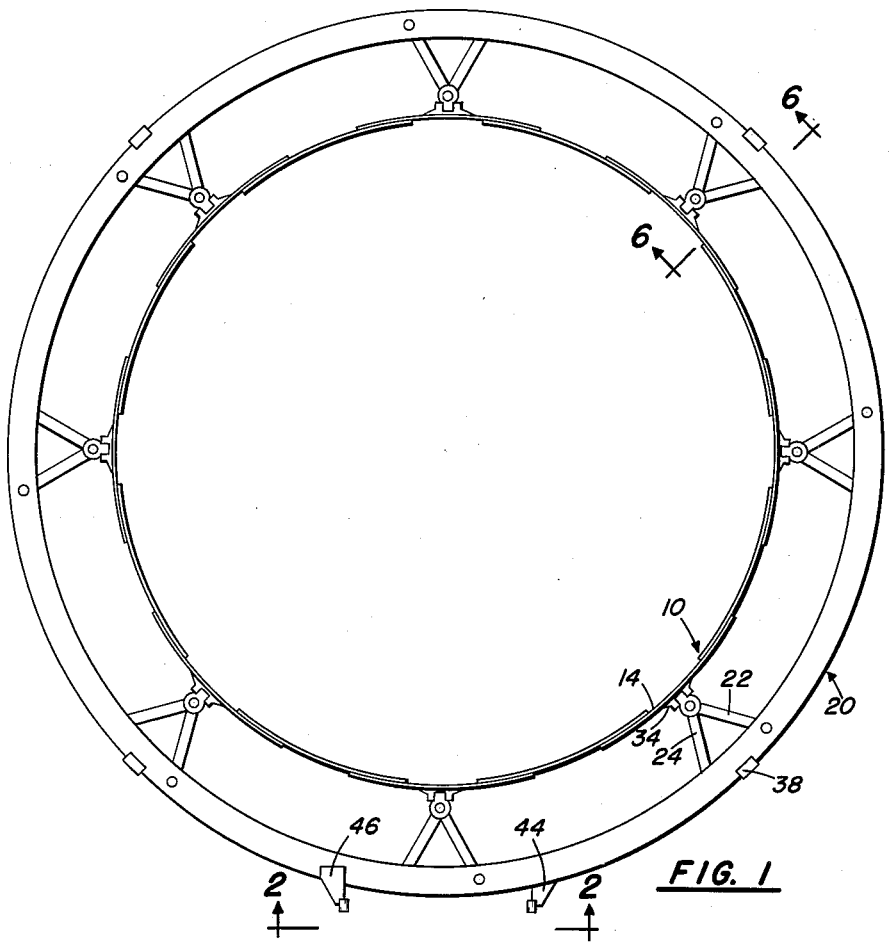
Fig. 1 is an end view of a nozzle provided with the nozzle leaf actuating assembly.

The nozzle 10 is of the iris type including a cylindrical casing 12, a part of which is made up of a number of leaves 14 mounted by means of a hinge 16 for movement toward and away from the longitudinal axis of the nozzle. The invention provides means for hingedly actuating these leaves in order to vary the cross sectional area of the nozzle.

A pair of concentric, relatively rotatable rings 18 and 20 (Fig. 4) are disposed around the nozzle and are of L shape and channel shape cross section, respectively, with the L-shaped ring 18 nested within the ring 20. A plurality of pairs of links are connected to the rings and the leaves 14 to hingedly actuate the leaves in response to rotation of the rings. A typical pair of links 22 and 24 are shown in Figs. 4 and 6, it being noted that link 22 is pivoted at one end to a wall of the ring 18 and one end of link 24 is pivoted to a wall of the ring 20. As best seen in Fig. 7, the opposite ends of the links 22 and 24 are mounted on a common pivot pin 26 that is secured to a block 28, the latter having a pin 30 carried thereby, which is disposed in slots 32. The longitudinal axis of pin 26 is substantially normal to pin 30. A bracket 34 is secured to leaf 14 (Fig. 6) and contains the slots 32 so that any motion of the links 22 and 24 is imparted through pins 26 and 30 to hinged movement of leaf 14.

A sufficient number of supports 38 are fixed at their ends to the nozzle casing and each has a substantially U-shaped guide 40 at or near its end in which part of ring 20 is slidable. Accordingly, the rings are so constrained that their motion is limited to rotary, this being the desired motion to spread or draw together the outer ends of the links for the purpose of actuating the leaves 14.

Figure 2:
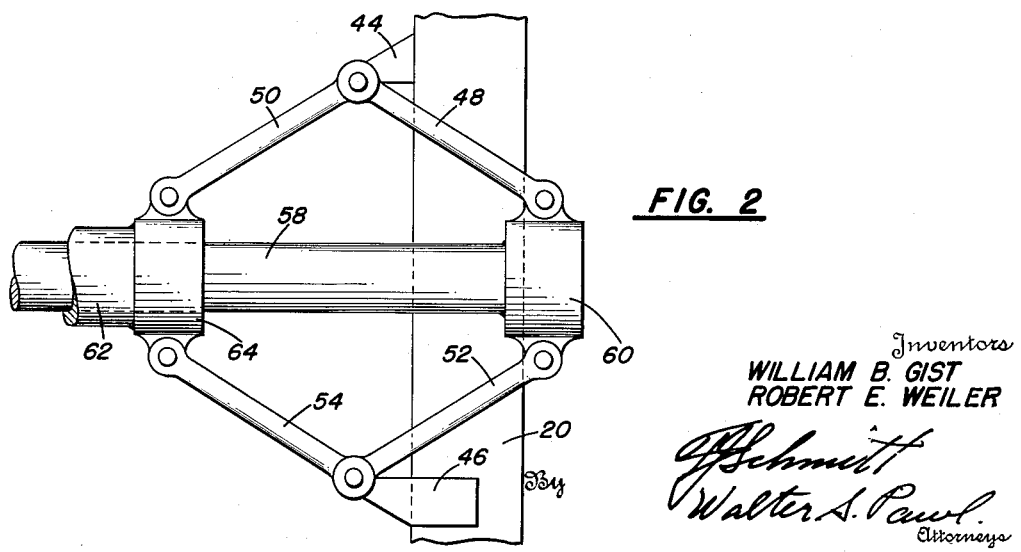
Fig. 2 is a top view of one form of a means to operate the leaf actuating assembly, and the vision line 2—2 of Fig. 1 showing its location if it were applied to the structure of Fig. 1.

Means are provided for moving the rings 18 and 20 with respect to each other, and one embodiment thereof is seen best in Figs. 2 and 4. Here, there are brackets 44 and 46 connected to rings 18 and 20 respectively. A toggle is connected to these brackets to draw them together or spread them apart, the toggle consisting of a pair of arms 48 and 50 pivoted to bracket 44, and a pair of arms 52 and 54 pivoted to bracket 46. A rod 58 axially movable by conventional means has a boss 60 at one end to which arms 48 and 52 are pivoted, and a sleeve 62 is slidable thereon, being provided with a bearing 64 to which arms 50 and 54 are pivoted.

In operation, the sleeve 62 and/or the rod 58 is moved axially, thereby spreading or withdrawing the arms of the toggle. This moves the brackets 44 and 46 and the rings 18 and 20 to which they are secured, rotatively thereby spreading or drawing together the links 22 and 24 of the several pairs of links. Due to the action of the structure (Fig. 6) connecting the pairs of links to the leaves 14, the latter are hingedly actuated.

In Fig. 3 another embodiment of the means to actuate rings 18 and 20 is shown and consists of a toggle 70 with its arms pivoted to brackets 44 and 46, there being internally threaded bearings 72 and 74 pivotally supporting the ends of the toggle arms in a manner similar to the pivotal connection of the toggle arms with boss 60 and bearing 64. A shaft 76 adapted to be rotated by a suitable source of power is oppositely threaded in sections, the threaded sections respectively being engaged with the threads of bearings 72 and 74 so that upon rotation of the shaft 76, the rings 18 and 20 are rotated with respect to each other. To prevent excessive torque transmission from the bearings 72 and 74 to the toggle arms, a rod 80 is slidably mounted in aligned passages of bearings 72 and 74.

It is understood that modifications that fall within the scope of the claims may be made without departing from the protection of the claims.

What is claimed is:

1. A system for actuating the leaves of an iris type variable area jet nozzle of an engine comprising two concentric rings, said rings being positioned circumferentially around the leaves of the nozzle, supports for the rings, pivot pins fitted in alternate leaves of the nozzle, a pair of toggle links connected with each of said pivot pins, one of each pair of links being operatively connected with each ring to form a positive connection from the rings to the leaves of the nozzle, said rings having contacting channel surfaces whereby by moving the rings relative to each other circumferentially by sliding on their channel surfaces, the toggle formed by the links will be actuated radially inward or outward which in turn moves the leaf surfaces inward or outward, to vary the nozzle exit area, and means for moving said rings relative to each other.

2. In a nozzle having a plurality of hinged leaves, means to actuate said leaves comprising a pair of circular channels in nested relation and substantially concentrically arranged with respect to the nozzle, pairs of links connecting said channels with said leaves, one link of each pair being pivoted to each channel, and means for rotating said channels with respect to each other thereby hingedly actuating said leaves.

3. In a nozzle that includes a casing wall provided with a plurality of leaves constituting a portion thereof, means for displacing said leaves to vary the cross sectional area of the nozzle, said means comprising a plurality of supports secured to said wall, a pair of concentric rings disposed around said nozzle adjacent to said leaves, means connected with said supports for guiding said rings, means mounting said leaves on said wall for pivotal movement, pairs of links pivoted to said leaves, one link of each pair being pivoted to one of said rings and the other link of each pair being pivoted to the other of said rings, whereby said leaves are pivotally displaced in response to relative movement of said rings.

4. In a nozzle that includes a casing wall provided with a plurality of leaves constituting a portion thereof, means for displacing said leaves to vary the cross sectional area of the nozzle, said means comprising a plurality of supports secured to said wall, a pair of concentric rings disposed around said nozzle adjacent to said leaves, means connected with said supports for guiding said rings, means mounting said leaves on said wall for pivotal movement, pairs of links, one link of each pair being pivoted to one of said rings and the other link of each pair being pivoted to the other of said rings, each pair of links being pivoted together adjacent one of said leaves, means slidingly and pivotally connecting each pair of links to the adjacent one of said leaves, and means operatively connected to said rings to move said rings relative to each other thereby pivotally actuating said leaves.

5. A variable area jet nozzle comprising a casing, leaves constituting a portion of the nozzle casing wall and mounted for pivotal movement toward and away from the longitudinal axis of the jet nozzle, a linkage for pivotally actuating said leaves, means connecting said linkage to said leaves and including a bracket secured to one of the leaves and provided with a slot, a first pin slidable in said slot, and means including a second pin having its longitudinal axis substantially normal to the first pin for connecting said linkage to said first pin.

6. In a variable area jet nozzle, a casing having hingedly mounted leaves, means for actuating said leaves including a pair of concentric rings and mechanical connecting elements extending between said rings and said leaves, means for moving said rings relative to each other to actuate the leaves and including a toggle with means to actuate said toggle.

7. In a variable area jet nozzle, a casing provided with hingedly supported leaves, a pair of concentric rings, linkage means connecting said leaves to said rings so that said leaves are hingedly moved in response to relative movement of said rings, a first pair of arms having inner ends pivoted to one of said rings, and a second pair of arms connected at their inner ends to the other of said rings, and means connected to the outer ends of said pairs of arms for moving the inner ends of said pairs toward and away from each other, thereby moving said rings with respect to each other.

References Cited in the file of this patent

UNITED STATES PATENTS 2,603,062    Weiler et al. _____ July 15, 1952